United States Patent
Jin et al.

(10) Patent No.: US 12,122,910 B2
(45) Date of Patent: Oct. 22, 2024

(54) POLYCARBONATE RESIN COMPOSITION FOR 3D PRINTING AND 3D PRINTING FILAMENT COMPRISING SAME

(71) Applicant: SAMYANG CORPORATION, Seoul (KR)

(72) Inventors: Sun Chul Jin, Namyangju-si (KR); Ki Yong Kim, Daejeon (KR); Hyung Jin Roh, Daejeon (KR); Jong Seong Yim, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 116 days.

(21) Appl. No.: 17/268,133

(22) PCT Filed: Jul. 25, 2019

(86) PCT No.: PCT/KR2019/009254
§ 371 (c)(1),
(2) Date: Feb. 12, 2021

(87) PCT Pub. No.: WO2020/036333
PCT Pub. Date: Feb. 20, 2020

(65) Prior Publication Data
US 2021/0163735 A1 Jun. 3, 2021

(30) Foreign Application Priority Data
Aug. 13, 2018 (KR) ........................ 10-2018-0094417

(51) Int. Cl.
| C08L 69/00 | (2006.01) |
| C08L 51/00 | (2006.01) |
| C08L 51/08 | (2006.01) |
| C08L 67/02 | (2006.01) |
| B29C 64/118 | (2017.01) |

(52) U.S. Cl.
CPC .............. *C08L 69/00* (2013.01); *C08L 51/08* (2013.01); *C08L 67/02* (2013.01); *B29C 64/118* (2017.08)

(58) Field of Classification Search
None
See application file for complete search history.

(56) References Cited

U.S. PATENT DOCUMENTS

| 2,999,835 A | 9/1961 | Goldberg | |
| 3,028,365 A | 4/1962 | Schnell et al. | |
| 3,153,008 A | 10/1964 | Fox | |
| 3,334,154 A | 8/1967 | Kim | |
| 6,423,767 B1 * | 7/2002 | Weber | C08L 51/04 |
| | | | 525/146 |
| 2001/0056140 A1 * | 12/2001 | Noro | C08K 5/523 |
| | | | 524/127 |
| 2006/0217496 A1 * | 9/2006 | Miura | C08L 69/00 |
| | | | 525/445 |
| 2008/0241578 A1 * | 10/2008 | Lin | C09K 21/12 |
| | | | 428/626 |
| 2010/0273922 A1 * | 10/2010 | Fujimoto | C08L 69/00 |
| | | | 524/145 |
| 2012/0244359 A1 * | 9/2012 | Meyer | B32B 27/36 |
| | | | 524/127 |
| 2013/0317150 A1 * | 11/2013 | Wan | C08L 83/10 |
| | | | 524/127 |
| 2015/0322261 A1 * | 11/2015 | Nakamoto | C08L 63/00 |
| | | | 524/150 |
| 2017/0198104 A1 | 7/2017 | Bheda et al. | |
| 2018/0015664 A1 | 1/2018 | Kabalnov et al. | |
| 2019/0010327 A1 * | 1/2019 | Gallucci | D01F 6/94 |
| 2021/0238411 A1 * | 8/2021 | Moniruzzaman | C08L 67/02 |

FOREIGN PATENT DOCUMENTS

| CN | 101200582 | * | 6/2008 |
| CN | 104962055 | * | 10/2015 |
| CN | 105462224 | * | 4/2016 |
| CN | 105506764 A | | 4/2016 |
| CN | 105623029 A | | 6/2016 |
| KR | 10-2014-0086056 A | | 7/2014 |
| KR | 10-2017-0054706 A | | 5/2017 |

OTHER PUBLICATIONS

EP patent application 18170082.4 filed Apr. 29, 2018 pp. 1-24. (Year: 2018).*
BASF product information for Ultradur B4500 (2018) pp. 1-2. (Year: 2018).*
Lanxess data sheet for Pocan B1300 (2017) pp. 1-3. (Year: 2017).*
Smith "Structural Changes and Energy Absorption Mechanisms During Fracture . . . " Polymer Engineering and Science 2017 pp. 109-120. (Year: 2017).*
International Search Report (PCT/ISA/210) issued in PCT/KR2019/009254 mailed on Oct. 25, 2019.
Supplementary European Search Report for European Application No. 19850608.1, dated Mar. 3, 2022.

* cited by examiner

*Primary Examiner* — David J Buttner
(74) *Attorney, Agent, or Firm* — Birch, Stewart, Kolasch & Birch, LLP

(57) ABSTRACT

The present invention relates to a polycarbonate resin composition for 3D printing and a 3D printing filament comprising same and, more specifically, to a polycarbonate resin composition for 3D printing and a 3D printing filament comprising same, the polycarbonate resin composition comprising a specific combination of a polycarbonate (PC) resin, a polybutylene terephthalate (PBT) resin, a superplasticizer, and an impact modifier, wherein the polycarbonate resin retains superior mechanical properties while particular properties, such as an output performance, a winding property, and an anti-shrinkage property, required for 3D printing filaments, are excellently balanced.

4 Claims, 1 Drawing Sheet

[FIGURE 1]
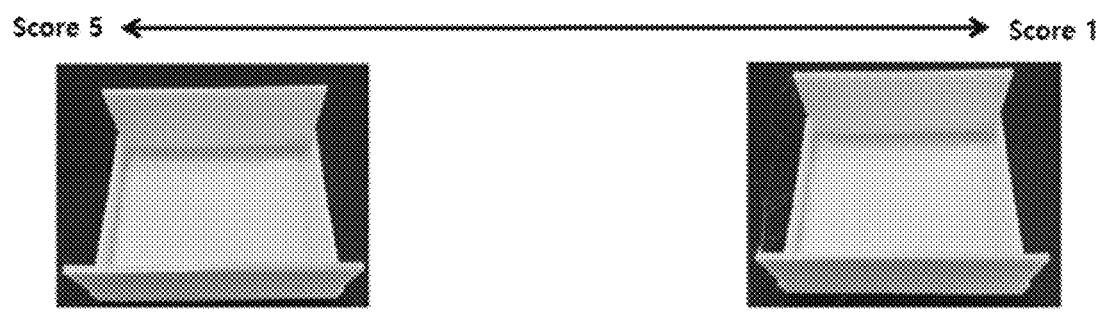
[FIGURE 2]

POLYCARBONATE RESIN COMPOSITION FOR 3D PRINTING AND 3D PRINTING FILAMENT COMPRISING SAME

TECHNICAL FIELD

The present invention relates to a polycarbonate resin composition for 3D printing and a filament for 3D printing comprising the same, and more specifically, a polycarbonate resin composition for 3D printing, which comprises specific combination of polycarbonate (PC) resin, polybutylene terephthalate (PBT) resin, plasticizer and impact modifier, and has good balance of specific properties required for filaments for 3D printing such as printability, winding property and anti-warpage, etc. while maintaining good mechanical properties of polycarbonate resin at the same time, and a filament for 3D printing comprising the same.

BACKGROUND ART

Although 3D printing can be performed in various printing manners according to applications, in consideration of the apparatus cost, material supply and printing difficulty, etc., the most common printing manner for industry and home use is material extrusion. Material extrusion is a printing method wherein the material provided in a filament form is melted in nozzle and laminated layer-by-layer, and resins for 3D printing filament used in such a manner include polylactic acid (PLA), acrylonitrile-butadiene-styrene (ABS), polycarbonate (PC) and polyimide (PI), etc.

Among the above, polylactic acid resin is the most widely used resin for 3D printing filament for general use. Polylactic acid resin does not smell during extrusion, and since it can be extruded even at a relatively low temperature, expensive printing apparatus is not required. However, since polylactic acid resin has poor mechanical properties, a resin for 3D printing filament which can be extruded at a relatively low temperature like polylactic acid and can also exhibit good mechanical properties such as high strength, etc. is needed.

Polycarbonate resin is an engineering plastic having good mechanical properties, thermal properties and dimensional stability, and has been used in various industries. However, in case of using polycarbonate as a resin for 3D printing filament for material extrusion, it shows poor printability causing high viscosity during 3D printing or the like, and since it has low flexibility, the filament may be broken if wound on a bobbin and stored.

Therefore, it is required to develop a polycarbonate resin composition for 3D printing filament which well satisfies all specific properties required for filaments for 3D printing such as printability, winding property and anti-warpage, etc.

CONTENTS OF THE INVENTION

Problems to be Solved

The purpose of the present invention is to provide a polycarbonate resin composition for 3D printing, which has good balance of specific properties required for filaments for 3D printer such as printability, winding property and anti-warpage, etc. while maintaining good mechanical properties of polycarbonate resin at the same time, and a filament for 3D printing comprising the same.

Technical Means

In order to achieve the above-stated purpose, the present invention provides a filament composition for 3D printing, comprising: based on total 100 parts by weight of the composition, (1) 45 to 95 parts by weight of polycarbonate resin; (2) 1 to 24 parts by weight of polybutylene terephthalate resin; (3) 1 to 19 parts by weight of plasticizer; and (4) 1 to 19 parts by weight of impact modifier.

In another aspect, the present invention provides a filament for 3D printing comprising the polycarbonate resin composition of the present invention.

Effect of the Invention

The filament composition for 3D printing according to the present invention maintains good mechanical properties of polycarbonate resin, and at the same time, it has good printability so as not to cause web generation during 3D printing, good winding property on a bobbin so as to be stored easily for a long time, and good anti-warpage so that stable printing is possible, and thus it can be used suitably as a filament for 3D printer, and thereby the economy of 3D printing can be improved and its application range can be broadened.

BRIEF EXPLANATION OF THE DRAWINGS

FIG. 1 illustrates the standard for evaluating the printability of resin for 3D printing, wherein the score becomes higher (5 as the highest) as the web generation during 3D printing becomes less.

FIG. 2 illustrates the standard for evaluating the anti-warpage of resin for 3D printing, wherein the score becomes higher (5 as the highest) as the warpage of the edge of the 3D-printed square box becomes less.

CONCRETE MODE FOR CARRYING OUT THE INVENTION

The present invention will be explained in detail below.

The filament composition for 3D printing of the present invention comprises (1) polycarbonate resin, (2) polybutylene terephthalate resin, (3) plasticizer and (4) impact modifier. In addition, the filament composition for 3D printing of the present invention can optionally further comprise (5) one or more other additives.

(1) Polycarbonate (PC) Resin

The polycarbonate resin which can be comprised in the filament composition for 3D printing of the present invention is preferably an aromatic polycarbonate resin, but there is no special limitation to its kind as long as the technical idea of the present invention can be realized thereby. Any thermoplastic aromatic polycarbonate resin conventionally used in this field can be used.

In an embodiment of the present invention, the aromatic polycarbonate resin may be prepared from a dihydric phenol, a carbonate precursor and a molecular weight-controlling agent, etc., and it includes linear and/or branched polycarbonate homopolymer and polyester copolymer, etc.

The dihydric phenol is one of the monomers constituting the aromatic polycarbonate resin, and it may be a compound represented by the following chemical formula 1.

[Chemical formula 1]

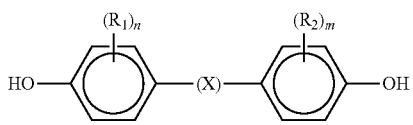

In the above chemical formula 1,

X represents an alkylene group; a linear, branched or cyclic alkylene group having no functional group; or a linear, branched or cyclic alkylene group having one or more functional groups selected from the group consisting of sulfide, ether, sulfoxide, sulfone, ketone, naphthyl and isobutylphenyl, and preferably, X may be a linear alkylene group having 1 to 10 carbon atoms or a branched alkylene group having 3 to 10 carbon atoms, or a cyclic alkylene group having 3 to 10 carbon atoms;

each of $R_1$ and $R_2$ may independently represent halogen atom, a linear alkyl group having 1 to 20 carbon atoms, a branched alkyl group having 3 to 20 carbon atoms, or a cyclic alkyl group having 3 to 20 carbon atoms; and each of m and n may independently be an integer of 0 to 4.

The non-limited example of the above dihydric phenol may be selected from bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl) methane, 1,1-bis(4-hydroxyphenyl)ethane, 1-ethyl-1,1-bis (4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, 2,2-bis(4-hydroxyphenyl)propane, 2,2-bis(4-hydroxyphenyl)butane, 2,2-bis(4-hydroxyphenyl) pentane, 2,2-bis(4-hydroxyphenyl)hexane, 2,2-bis(4-hydroxyphenyl)nonane, 2,2-bis(3-methyl-4-hydroxyphenyl) propane, 2,2-bis(3-fluoro-4-hydroxyphenyl)propane, 4-methyl-2,2-bis(4-hydroxyphenyl)pentane, 4,4-bis(4-hydroxyphenyl)heptane, diphenyl-bis(4-hydroxyphenyl)methane, resorcinol, hydroquinone, 4,4'-dihydroxyphenyl ether [bis(4-hydroxyphenyl)ether], 4,4'-dihydroxy-2,5-dihydroxydiphenyl ether, 4,4'-dihydroxy-3,3'-dichlorodiphenyl ether, bis(3,5-dimethyl-4-hydroxyphenyl) ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl) cyclododecane, 1,1-bis(4-hydroxyphenyl)butane, 1,1-bis(4-hydroxyphenyl)decane, 1,4-bis(4-hydroxyphenyl)propane, 1,4-bis(4-hydroxyphenyl)butane, 1,4-bis(4-hydroxyphenyl) isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl) methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl) sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydroquinone, 1,5-dihydroxynaphthalene and 2,6-dihydroxynaphthalene, but it is not limited thereto. Among them, the representative one is 2,2-bis(4-hydroxyphenyl) propane (bisphenol A). For other functional dihydric phenols, U.S. Pat. Nos. 2,999,835, 3,028,365, 3,153,008 and 3,334,154, etc. may be referred to. The above dihydric phenol may be used alone or in combination of two or more of them.

The carbonate precursor is another monomer constituting the aromatic polycarbonate resin, and its non-limited example may be carbonyl chloride (phosgene), carbonyl bromide, bis halo formate, diphenyl carbonate or dimethyl carbonate, etc. Preferably, carbonyl chloride (phosgene) may be used.

As the molecular weight-controlling agent, the conventionally known compound, i.e., a monofunctional compound similar to a monomer used in preparation of thermoplastic aromatic polycarbonate resin may be used. The non-limiting examples of the molecular weight-controlling agent may be derivatives based on phenol (for example, para-isopropylphenol, para-tert-butylphenol (PTBP), para-cumylphenol, para-isooctylphenol, para-isononylphenol, etc.) aliphatic alcohols, etc. Preferably, para-tert-butylphenol (PTBP) may be used.

The polycarbonate resin comprised in the resin composition of the present invention may have a viscosity average molecular weight of preferably 15,000 to 50,000, and more preferably 16,000 to 30,000.

The filament composition for 3D printing of the present invention comprises, based on total 100 parts by weight of the composition, 45 to 95 parts by weight of the polycarbonate resin. If the amount of the polycarbonate resin in 100 parts by weight of the composition is less than 45 parts by weight, mechanical strength of the 3D printing product may be lowered, and if it is greater than 95 parts by weight, there may be a problem in winding property of the filament.

More concretely, based on total 100 parts by weight of the filament composition for 3D printing of the present invention, the amount of the polycarbonate resin in the resin composition may be 45 parts by weight or more, 50 parts by weight or more, 55 parts by weight or more, or 60 parts by weight or more, and 95 parts by weight or less, 90 parts by weight or less, 85 parts by weight or less, or 80 parts by weight or less. Preferably, the amount of the polycarbonate resin in 100 parts by weight of the composition may be, for example, 50 to 95 parts by weight, more preferably 55 to 90 parts by weight, and still more preferably 55 to 85 parts by weight.

(2) Polybutylene Terephthalate (PBT) Resin

The polybutylene terephthalate resin comprised in the filament composition for 3D printing of the present invention is a polymer obtained by condensation-polymerization through direct esterification reaction or transesterification reaction using butane-1,4-diol, and terephthalic acid or dimethyl terephthalate, as monomers.

In a preferred embodiment of the present invention, the polybutylene terephthalate resin may have a melting temperature of 215 to 235° C., and more preferably 220 to 230° C. In addition, its intrinsic viscosity (IV) is preferably 0.45 to 1.6 dl/g, and more preferably 0.80 to 1.3 dl/g.

The filament composition for 3D printing of the present invention comprises, based on total 100 parts by weight of the composition, 1 to 24 parts by weight of the polybutylene terephthalate resin. If the amount of the polybutylene terephthalate resin in 100 parts by weight of the composition is less than 1 part by weight, it is hard to expect improvement in chemical resistance of the 3D printing product, and if it is greater than 24 parts by weight, mechanical properties of the 3D printing product may be lowered.

More concretely, based on total 100 parts by weight of the filament composition for 3D printing of the present invention, the amount of the polybutylene terephthalate resin in the resin composition may be 1 part by weight or more, 2 parts by weight or more, 3 parts by weight or more, 4 parts by weight or more, or 5 parts by weight or more, and 24 parts by weight or less, 22 parts by weight or less, 20 parts by weight or less, 18 parts by weight or less, 16 parts by weight or less, 14 parts by weight or less, 12 parts by weight or less, or 10 parts by weight or less. Preferably, the amount of the polybutylene terephthalate resin in 100 parts by weight of the composition may be, for example, 1 to 20 parts by weight, more preferably 1 to 15 parts by weight, and still more preferably 1 to 10 parts by weight.

(3) Plasticizer

As the plasticizer comprised in the filament composition for 3D printing of the present invention, any material which can improve flowability of polycarbonate resin composition can be used without special limitation, and preferably, aromatic phosphate, aliphatic phosphate, or a mixture thereof may be used as the plasticizer.

There is no special limitation to the kind that can be used, and any monophosphate compound or phosphate oligomer compound conventionally known in this field can be used. For example, commercially available PX-200, PX-201, PX-202, CR-733S, CR-741, CR747 (DAIHACHICHEMICAL INDUSTRY Co., Ltd.), FP-600, FP-700, FP-800 (ADEKA Co.), etc. can be used.

The filament composition for 3D printing of the present invention comprises, based on total 100 parts by weight of the composition, 1 to 19 parts by weight of the plasticizer. If the amount of the plasticizer in 100 parts by weight of the composition is less than 1 part by weight, the effect of improving flowability of the resin composition is little and so high printing temperature is required for 3D printing, and thus expensive printing apparatus for high temperature printing is needed, and if it is greater than 19 parts by weight, it is impossible to extrude the resin composition itself and thus it cannot be obtained in pellet form.

More concretely, based on total 100 parts by weight of the filament composition for 3D printing of the present invention, the amount of the plasticizer in the resin composition may be 1 part by weight or more, 2 parts by weight or more, 3 parts by weight or more, 4 parts by weight or more, or 5 parts by weight or more, and 19 parts by weight or less, 18 parts by weight or less, 17 parts by weight or less, 16 parts by weight or less, 15 parts by weight or less, 14 parts by weight or less, 13 parts by weight or less, 12 parts by weight or less, 11 parts by weight or less, or 10 parts by weight or less. Preferably, the amount of the plasticizer in 100 parts by weight of the composition may be, for example, 2 to 18 parts by weight, more preferably 2 to 15 parts by weight, and still more preferably 5 to 15 parts by weight.

(4) Impact Modifier

As the impact modifier comprised in the filament composition for 3D printing of the present invention, any material which can increase flexibility of polycarbonate resin composition and thus improve winding property of the filament on a bobbin can be used without special limitation, and preferably, it may be a copolymer of core-shell structure.

The copolymer of core-shell structure may be prepared by polymerizing one or more selected from monomers of C4-C6 diene-based rubber, acrylate-based rubber, or silicone-based rubber, and then grafting the rubber with one or more selected from graftable unsaturated compounds such as C1-C8 methacrylic acid alkyl esters, C1-C8 acrylic acid alkyl esters, C1-C8 methacrylic acid esters, maleic anhydride, maleimide nucleus-substituted with C1-C4 alkyl or phenyl, to form a core-shell structure, wherein the rubber amount is preferably 5 to 10 parts by weight, based on 100 parts by weight of the copolymer of core-shell structure.

The C1-C8 methacrylic acid alkyl ester or C1-C8 acrylic acid alkyl ester is an ester of acrylic acid or methacrylic acid, respectively, with a monohydric alcohol having 1 to 8 carbon atoms. Concrete examples thereof may be methacrylic acid methyl ester, methacrylic acid ethyl ester, methacrylic acid propyl ester, acrylic acid methyl ester, acrylic acid ethyl ester or acrylic acid propyl ester, and among them, methacrylic acid methyl ester is most preferable.

The acrylate-based rubber is prepared by using acrylate monomer such as methyl acrylate, ethyl acrylate, n-propyl acrylate, n-butyl acrylate, 2-ethylhexyl acrylate, hexyl methacrylate, or 2-ethylhexyl methacrylate, etc., and at this time, a curing agent such as ethylene glycol dimethacrylate, propylene glycol dimethacrylate, 1,3-butylene glycol dimethacrylate, 1,4-butylene glycol dimethacrylate, allyl methacrylate, or triallyl cyanurate, etc. is used.

The silicone-based rubber may be prepared from cyclosiloxane, and example thereof may be hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, or octaphenylcyclotetrasiloxane, etc. At this time, a curing agent such as trimethoxymethylsilane, triethoxyphenylsilane, tetramethoxysilane, or tetraethoxysilane, etc. is used.

Among the above rubbers, sole use of silicone-based rubber or mixed use of silicone-based rubber and acrylate-based rubber exhibits more advantageous effects in terms of chemical resistance and thermal stability, due to the structural stability.

The filament composition for 3D printing of the present invention comprises, based on total 100 parts by weight of the composition, 1 to 19 parts by weight of the impact modifier. If the amount of the impact modifier in 100 parts by weight of the composition is less than 1 part by weight, the effect of improving impact strength is little and so it is hard to achieve good winding property, and if it is greater than 19 parts by weight, the thermal stability may be lowered and the mechanical properties, etc. may be lowered due to gas.

More concretely, based on total 100 parts by weight of the filament composition for 3D printing of the present invention, the amount of the impact modifier in the resin composition may be 1 part by weight or more, 2 parts by weight or more, 3 parts by weight or more, 4 parts by weight or more, or 5 parts by weight or more, and 19 parts by weight or less, 18 parts by weight or less, 17 parts by weight or less, 16 parts by weight or less, 15 parts by weight or less, 14 parts by weight or less, 13 parts by weight or less, 12 parts by weight or less, 11 parts by weight or less, or 10 parts by weight or less. Preferably, the amount of the impact modifier in 100 parts by weight of the composition may be, for example, 2 to 18 parts by weight, more preferably 2 to 15 parts by weight, and still more preferably 5 to 15 parts by weight.

(5) Other Additive

In addition, to the above-explained components (1) to (4), the filament composition for 3D printing of the present invention can further comprise one or more other additives conventionally added in thermoplastic resin compositions for injection molding or extrusion molding. For example, it can further comprise one or more additives selected from the group consisting of antioxidant, lubricant, UV absorber, or mixtures thereof.

Concretely, as the antioxidant, organic phosphorus-based antioxidant such as tris(nonylphenyl)phosphite, (2,4,6-tri-tert-butylphenyl)(2-butyl-2-ethyl-1,3-propanediol)phosphite, tris(2,4-dibutylphenyl)phosphite, bis(2,4-di-tert-butylphenyl)pentaerythritol diphosphite, bis(2,4-di-tert-butyl-4-methylphenyl)pentaerythritol diphosphite or distearyl pentaerythritol diphosphate, etc.; phenol-based antioxidant such as pentaerythritol tetrakis(3-(3,5-di-tert-butyl-4-hydroxyphenyl) propionate or octadecyl-3-(3,5-di-tert-butyl-4-hydroxyphenyl)propionate, etc.; thioester-based antioxidant such as pentaerythritol tetrakis(3-dodecylthiopropionate), etc.; or a mixture of two or more of the above may be used, but it is not limited thereto.

As the lubricant, polyethylene-based compound, ethylene-ester-based compound, ethylene glycol-glycerine ester-based compound, montan-based compound, ethylene glycol-glycerine montanic acid-based compound, ester-based compound, or a mixture of two or more of the above may be used, but it is not limited thereto.

As the UV absorber, benzotriazole-based compound, hydroxyphenyltriazine-based compound, pyrimidine-based compound, cyanoacrylate-based compound, or a mixture of two or more of the above may be used, but it is not limited thereto.

The amount of the other additive is not especially limited, and it can be used in an amount for providing additional function within a scope that does not harm the desired properties of the polycarbonate resin composition of the present invention.

According to an embodiment of the present invention, the amounts of the other additive may be, based on total 100 parts by weight of the composition of the present invention, 0.1 to 10 parts by weight, preferably 0.5 to 10 parts by weight, and more preferably 1 to 8 parts by weight. If the amount of the other additive in 100 parts by weight of the composition is less than 0.1 part by weight, the effect of improving the function according to the use of the other additive is little, and if it is greater than 10 parts by weight, the mechanical properties of the resin composition may be lowered.

According to another aspect of the present invention, a filament for 3D printing comprising the polycarbonate resin composition of the present invention is provided.

The filament for 3D printing can be prepared by extrusion molding of the resin composition of the present invention.

The present invention is explained in more detail through the following Examples and Comparative Examples. However, the scope of the present invention is not limited thereby in any manner.

EXAMPLES

The ingredients used in the following Examples and Comparative Examples are as follows:
Polycarbonate (PC): Bisphenol A type linear polycarbonate with a viscosity average molecular weight of about 17,000
Polybutylene terephthalate (PBT): Polybutylene terephthalate (melting temperature: about 225° C., intrinsic viscosity (IV): about 1.0 dl/g)
Plasticizer: PX-200 (Daihachi Corporation)
Impact modifier: M732 (Kaneka Corporation)
Other additives: Antioxidant (0.5 part by weight), lubricant (1 part by weight) and UV absorber (0.5 part by weight)
Antioxidant: Thanox 412S (Rianlon Corporation)
Lubricant: PETS AHS (SYNERGY MATERIAL)
UV absorber: LA-300K (ADEKA)

Examples 1 to 15 and Comparative Examples 1 to 7

According to the composition ratios shown in the following Table 1, the ingredients were fed into a super mixer and mixed therein for about 2 minutes to prepare a polycarbonate resin composition. The composition was kneaded and extruded by using a twin-axes melting-kneading extruder at 200° C. to 240° C. to prepare pellets for molding. The prepared pellets were dried with hot air at 90° C. to 120° C. for 4 hours or longer, and then prepared as a filament sample for 3D printer with a diameter of 1.75 mm. The filament was prepared by kneading and extruding the pellets by using a single-axe melting-kneading extruder. The temperature ranged from 200° C. to 240° C., and the filament coming out from the extruder was wound on a bobbin. The thickness of the filament was 1.75 mm and it was measured through a laser gauge in real time.

TABLE 1

|  |  | PC | PBT | Plasticizer | Impact modifier | Other additives |
|---|---|---|---|---|---|---|
| Example | 1 | 83 | 5 | 5 | 5 | 2 |
|  | 2 | 73 | 5 | 15 | 5 | 2 |
|  | 3 | 78 | 5 | 5 | 10 | 2 |
|  | 4 | 68 | 5 | 15 | 10 | 2 |
|  | 5 | 73 | 5 | 5 | 15 | 2 |
|  | 6 | 63 | 5 | 15 | 15 | 2 |
|  | 7 | 78 | 10 | 5 | 5 | 2 |
|  | 8 | 68 | 10 | 15 | 5 | 2 |
|  | 11 | 68 | 10 | 5 | 15 | 2 |
|  | 12 | 58 | 10 | 15 | 15 | 2 |
|  | 13 | 68 | 20 | 5 | 5 | 2 |
|  | 14 | 58 | 20 | 15 | 5 | 2 |
|  | 15 | 58 | 20 | 5 | 15 | 2 |
| Comparative Example | 1 | 88 | 0 | 5 | 5 | 2 |
|  | 2 | 63 | 25 | 5 | 5 | 2 |
|  | 3 | 68 | 10 | 20 | 5 | 2 |
|  | 4 | 68 | 5 | 5 | 20 | 2 |
|  | 5 | 63 | 20 | 0 | 15 | 2 |
|  | 6 | 63 | 10 | 5 | 20 | 2 |
|  | 7 | 83 | 10 | 5 | 0 | 2 |

For each of the filament samples prepared as above, the following properties were measured or evaluated, and the results are shown in the following Table 2.
<Methods for Measuring Properties>
(1) Printing Temperature
When the filament sample was printed out through a nozzle with a diameter of 0.4 mm in a 3D printer for general material extrusion, the nozzle temperature at which the filament was laminated stably to form a product was measured as the printing temperature.
(2) Web Generation
A square sample of 50 mm×50 mm was printed out at the corresponding temperature. The phenomenon of generating thread-like thin material other than the printed product was expressed as web generation. Such web generation deteriorates the appearance of the printed product. Thus, web generation was scored according to the degree of generation. That is, according to the degree of web generation, the scores ranged from 5 to 0 under the following standards (Score 5 and 4 are regarded as no problem and marked with X, and Score 3 to 0 are regarded as problematic and marked with O) (cf. FIG. 1):

Score 5: Less than two webs generated
Score 4: Two or more webs generated
Score 3: Four or more webs generated
Score 2: Six or more webs generated
Score 1: Eight or more webs generated
Score 0: Ten or more webs generated (3) Winding Property The polycarbonate resin composition was prepared as a filament sample for 3D printer with a diameter of 1.75 mm. Then, in each of the cases of winding it on a bobbin with a diameter of 8 cm, storing it after the winding, and using it after the winding, whether or not the sample was broken was observed with naked eye. 5 specimens for tensile strength according to ASTM D638 were mounted on Strain 2% Bending tester. After one-week observation, Score 5 was given to breakage of no specimen whereas Score 0 was given to breakage of all 5 specimens. The standards are as follows:

Score 5: No specimen broken
Score 4: One specimen broken among five
Score 3: Two specimens broken among five
Score 2: Three specimens broken among five
Score 1: Four specimens broken among five
Score 0: All five specimens broken (4) Anti-Warpage A square sample of 50 mm×50 mm was printed out at the corresponding temperature. The phenomenon of the product twisted after 1 hour from the printing out was observed with naked eye, and scored from 0 to 5 according to the degree of twist (cf. FIG. 2). The standards are as follows:

Score 5: Less than 2% of the total area shrunken
Score 4: 2% or more of the total area shrunken
Score 3: 4% or more of the total area shrunken
Score 2: 6% or more of the total area shrunken
Score 1: 8% or more of the total area shrunken
Score 0: 10% or more of the total area shrunken (5) Mechanical Strength For the samples prepared in Examples 1 to 15 and Comparative Examples 1 to 7, the tensile strength was measured according to ASTM D638, and the flexural strength was measured according to ASTM D790. The measured tensile strength and flexural strength were compared with those of the sample of the following general reference example to confirm whether the test sample achieved 80% or more of the tensile strength and flexural strength of the sample of the reference example.

Preparation of Filament of Reference Example

In order to prepare a general polycarbonate sample, a polycarbonate (TRIREX 3022, Samyang Corporation) was dried with hot air at 100° C. for 4 hours, and molded by injection at 290° C. to prepare the sample. For the prepared sample, tensile strength and flexural strength were measured according to ASTM D638 and ASTM D790, respectively. The results are as follows:

Tensile strength: 680 kgf/cm$^2$
Flexural strength: 900 kgf/cm$^2$

TABLE 2

|  |  | Printing temperature | Web generation | Winding property | Anti-warpage | Mechanical strength* |
|---|---|---|---|---|---|---|
| Examples | 1 | 260° C. | X | 5 | 3 | 92% |
|  | 2 | 240° C. | X | 4 | 4 | 85% |
|  | 3 | 255° C. | X | 5 | 3 | 90% |
|  | 4 | 235° C. | X | 3 | 4 | 81% |
|  | 5 | 250° C. | X | 5 | 3 | 88% |
|  | 6 | 230° C. | X | 4 | 4 | 82% |
|  | 7 | 255° C. | X | 5 | 4 | 86% |
|  | 8 | 240° C. | X | 3 | 5 | 84% |
|  | 11 | 240° C. | X | 5 | 4 | 81% |
|  | 12 | 225° C. | X | 4 | 5 | 80% |
|  | 13 | 240° C. | X | 3 | 4 | 83% |
|  | 14 | 225° C. | X | 4 | 5 | 80% |
|  | 15 | 235° C. | X | 4 | 5 | 80% |
| Comparative Examples | 1 | 270° C. | Not printable | 3 | 2 | 98% |
|  | 2 | 210° C. | ○ | 1 | 5 | 73% |
|  | 3 |  | Not measurable |  |  | 80% |
|  | 4 | 250° C. | ○ | 4 | 4 | 75% |
|  | 5 | 245° C. | X | 1 | 3 | 82% |
|  | 6 | 255° C. | ○ | 5 | 4 | 75% |
|  | 7 | 255° C. | X | 2 | 4 | 78% |

*Mechanical strength: Pass when achieving 80% or more of the tensile strength and flexural strength of the reference example (TRIREX 3022)

The invention claimed is:

1. A filament for 3D printing prepared by extrusion molding of a composition, comprising:
   based on total 100 parts by weight of the composition,
   (1) 73 to 83 parts by weight of polycarbonate resin;
   (2) 5 to 10 parts by weight of polybutylene terephthalate resin;
   (3) 5 to 10 parts by weight of plasticizer; and
   (4) 5 to 15 parts by weight of impact modifier,
   wherein the filament has a 3D printing temperature of from 225° C. to 260° C., and generates no web during 3D printing, and
   wherein the impact modifier is a core-shell graft copolymer comprising a core prepared by polymerizing one or more rubber monomers selected from the group consisting of C4-C6 diene-based rubber monomer, acrylate-based rubber monomer, or silicone-based rubber monomer, and a shell prepared by grafting the core with one or more monomers selected from the group consisting of C1-C8 methacrylic acid alkyl esters, C1-C8 acrylic acid alkyl esters, C1-C8 methacrylic acid esters, maleic anhydride, or maleimide nucleus-substituted with C1-C4 alkyl or phenyl.

2. The filament for 3D printing of claim 1, wherein the polycarbonate resin has a viscosity average molecular weight of 15,000 to 50,000.

3. The filament for 3D printing of claim 1, wherein the plasticizer is aromatic phosphate, aliphatic phosphate, or a mixture thereof.

4. The filament for 3D printing of claim 1, wherein the composition further comprises one or more additives selected from the group consisting of antioxidant, lubricant, UV absorber, or mixtures thereof.

* * * * *